No. 730,453. PATENTED JUNE 9, 1903.
J. GROSS.
HAY LOADER.
APPLICATION FILED MAY 14, 1902.
NO MODEL. 2 SHEETS—SHEET 1.
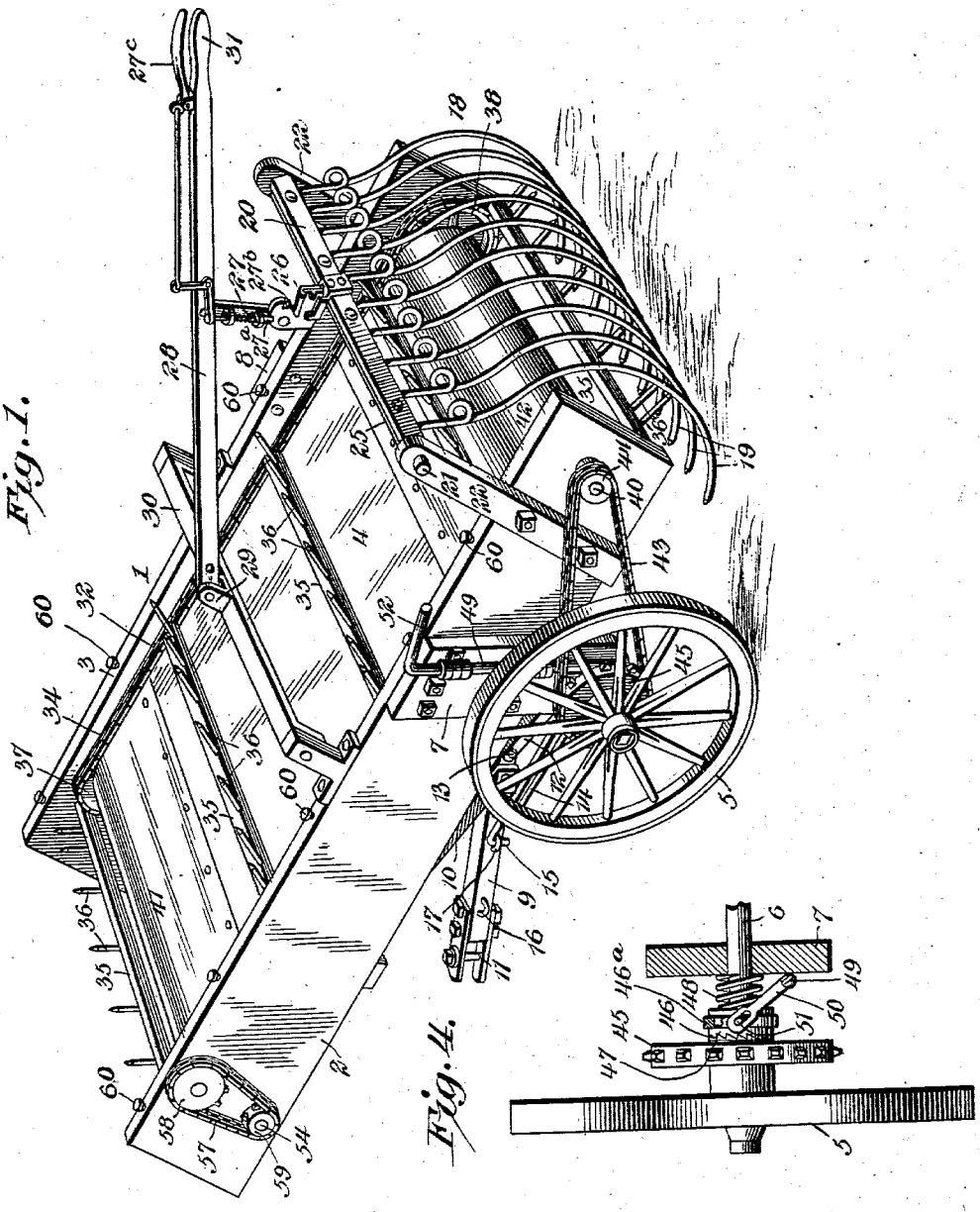
John Gross, Inventor.

No. 730,453. PATENTED JUNE 9, 1903.
J. GROSS.
HAY LOADER.
APPLICATION FILED MAY 14, 1902.
NO MODEL. 2 SHEETS—SHEET 2.
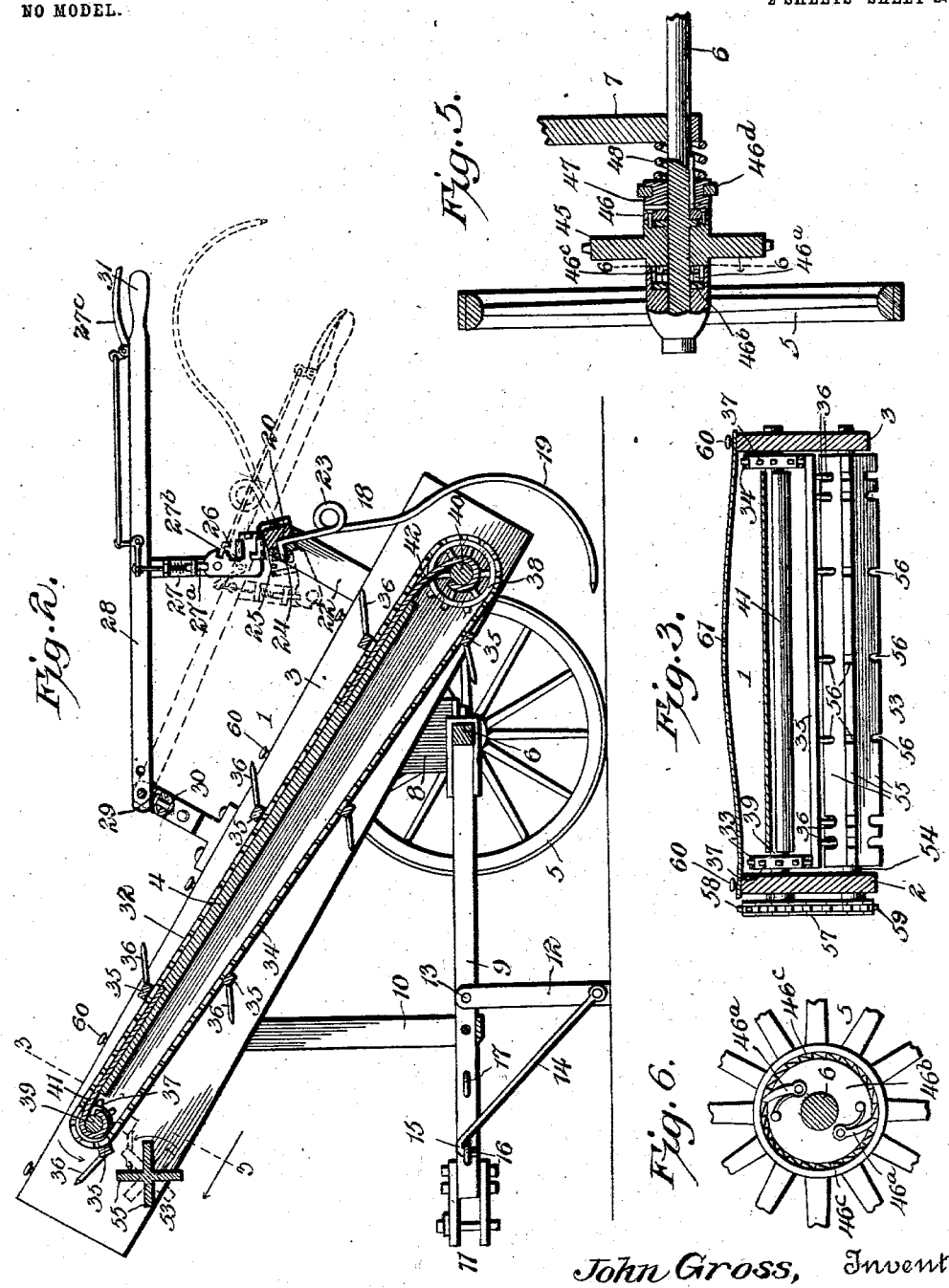
John Gross, Inventor No. 730,453. Patented June 9, 1903.

UNITED STATES PATENT OFFICE.

JOHN GROSS, OF CARROLL, IOWA.

HAY-LOADER.

SPECIFICATION forming part of Letters Patent No. 730,453, dated June 9, 1903.

Application filed May 14, 1902. Serial No. 107,330. (No model.)

*To all whom it may concern:*

Be it known that I, JOHN GROSS, a citizen of the United States, residing at Carroll, in the county of Carroll and State of Iowa, have invented a new and useful Hay-Loader, of which the following is a specification.

This invention relates to a novel hay-loader, and has for its object the production of a simple and efficient apparatus arranged to be drawn over the field by a wagon and capable of raking up the hay and delivering it automatically to the wagon as the latter advances.

To this end the invention contemplates the employment of a wheeled vehicle, including an inclined body portion carrying an endless conveyer operated by traction, a rake-frame disposed adjacent to the lower end of the conveyer to gather the hay and deliver it to the conveyer, and a rotary delivering drum or distributer located at the upper end of the conveyer and operated thereby to detach the hay from the distributer teeth or fingers and insure its delivery to the wagon.

Further objects of the invention are to provide means for preventing the hay from becoming wrapped around the shafts of the conveyer, to improve the construction of the rotary delivering-drum, to provide simple and effective means for raising and lowering the rake-frame, and to equip the loader with means for sustaining it in its normal position when detached from the wagon.

Other objects of the invention and novel features of construction will appear during the course of the succeeding description of the preferred form of the invention, which for the purposes of this application is illustrated in the accompanying drawings.

In said drawings, Figure 1 is a perspective view of the loader complete. Fig. 2 is a longitudinal sectional view thereof. Fig. 3 is a transverse sectional view on the line 3 3 of Fig. 2. Fig. 4 is a sectional elevation showing the mechanism for throwing the loader into and out of operation. Fig. 5 is a detail sectional view showing the relation of a carrying-wheel and axle to the sprocket from which the conveyer is driven, and Fig. 6 is a detail sectional view on the line 6 6 of Fig. 5.

Like numerals of reference are employed to designate corresponding parts throughout the views.

The body or frame 1 of the loader, comprising the side boards 2 and 3, spaced apart by a partition or floor 4, is supported by carrying-wheels 5, mounted on an axle 6, extending through drop-brackets 7 and 8, secured to the side boards 2 and 3 and extended below the same. To the axle 6 is also secured the rear end of a tongue 9, disposed normally in a horizontal position, and to which are secured at an advanced point the lower ends of a pair of vertically-inclined braces 10, secured at their upper ends to the side boards of the body 1 and serving to retain said body in an inclined position, so that the upper end of the loader may be disposed at a sufficient elevation to deliver the hay to the wagon.

When in use, the loader is attached to the rear end of the wagon through the medium of the tongue 9, provided at its front end with a clevis-bolt 11 to facilitate the connection, and when the loader is not in use the tongue is supported in its horizontal position by a leg 12, pivoted at its upper end to the tongue, as indicated at 13, and retained in position by an inclined brace 14, pivoted to the lower end of the tongue and having a hook 15, arranged to engage a keeper 16, projecting from the tongue adjacent to its front end. When the loader is in use, the leg 12 is swung upwardly out of contact with the ground and is retained by the engagement of the brace 14 with a keeper 17, located in rear of the keeper 16, this latter position of the parts being shown in Fig. 1.

The mechanism for gathering the hay as the loader advances comprehends a rake-frame 18, comprising a series of rake teeth or fingers 19 and a transverse rotary rake-bar 20, supporting the upper ends of the teeth and provided with terminal trunnions 21, having bearings in the upper ends of standards 22, extended above the side boards 2 and 3, adjacent to the rear end of the loader. The teeth 19 are curved longitudinally, as usual in this type of implement, and each is formed with a spring-coil 23 adjacent to the bar 20 to lend resiliency to the rake. The upper ends or shanks 24 of the teeth are of rightangular form, as shown in Fig. 2, and are imposed against the front side of the bar 20, to which is attached a keeper-plate 25, provided with apertures through which the angular ends of the shanks extend. By this arrangement it will be noted that all of the rake-teeth are secured to the rake-bar by a common retaining device—to wit, the plate 25.

It is obvious that some means must be provided for raising the rake to an inoperative position when the loader is being transported from one point of use to another, and I therefore provide the bar 20 with an extensible lateral arm 26, pivoted at its end to an arm 27, depending from what may be termed the "rake-lever" 28, fulcrumed at its front end in a bracket 29, carried by a transverse bar 30, extending across the loader at a slight elevation and retained at its opposite ends by the side boards 2 and 3. The rear end of the lever extends behind the loader and is provided with a handle 31, which may be drawn down by the operator to effect the elevation of the rake-frame to the position shown in dotted lines in Fig. 2. The rake is held in its elevated position by a latch $27^a$, mounted on the arm 27, engaging a notch $27^b$ in the arm 26, and operated by the latch-handle $27^c$, disposed adjacent to the handle of the rake-lever.

As the loader is drawn over the ground by the advance of the wagon the rake is disposed to gather the hay and deliver it to an endless conveyer 32, disposed lengthwise of the body and having its upper run traveling over the platform or floor 4. This conveyer comprises a pair of endless sprocket-chains 33 and 34, connected by transverse tooth-bars 35, carrying each a series of teeth 36, which are disposed to assume a rearward inclination as they travel up the inclined platform to deliver the hay from the front end of the loader. The sprocket-chains 33 and 34 are passed around sprocket-wheels 37 and 38, mounted on transverse shafts 39 and 40, journaled in the side boards 2 and 3 adjacent to the opposite ends of the frame, the shaft 39 being disposed somewhat nearer the upper edge of the frame and the shaft 40 somewhat nearer the lower edge thereof, so that as the conveyer-teeth approach the lower end of the loader they will project below the bottom thereof and will extend above the top of the loader when passing around the forward sprocket-wheels. Inasmuch as the endless conveyer is of open form, the hay is more or less liable to become wrapped around the shafts 39 and 40, and thus interfere with the proper movement of the conveyer. I therefore provide guard-plates 41 and 42, secured to the opposite ends of the floor 4 and passed around the shafts, as shown in Fig. 2, to guard the same.

I have heretofore stated that the loader is operated by traction, and by reference to Fig. 1 it will be seen that this end is attained by gearing the shaft 40 to the vehicle-axle 6 through the medium of a sprocket-chain 43, passed around a comparatively small sprocket-wheel 44, keyed upon the shaft 40, and around a somewhat-larger wheel 45, mounted to revolve upon the axle 6 and provided with a clutch-disk 46, disposed to be engaged by a clutch-collar 47, splined on the axle and urged toward the disk 46 by a spring 48, interposed between the collar 47 and the bracket 7. As the loader is drawn over the ground by the wagon to which it is attached the rotation of the carrying-wheel 5 will rotate the sprocket-wheel 45 and through the intermediate gearing will drive the conveyer to effect the conveyance of the hay from the rake to the upper end of the loader. The connection between the carrying-wheels and axle is effected by spring-pressed pawls $46^a$, mounted upon annular flanges $46^b$, rigid with the axle and located within the hubs of the carrying-wheels. These hubs are formed with internal teeth $46^c$, engaged by the pawls, so that when the loader is advancing the traction of both carrying-wheels is exerted to rotate the axle and drive the conveyer. In turning the loader, however, the axle may rotate independently of either one of the wheels in an obvious manner.

For the purpose of throwing the loader into and out of gear as it is desired for use or for transportation, as the case may be, I provide a vertically-disposed crank-shaft 49, mounted in suitable bearings at one side of the loader. This crank-shaft is provided at its lower end with a slotted crank-arm 50, engaging a pin 51 upon the ring $46^d$, and at its upper end is formed with a handle 52, by means of which the shaft 49 may be rocked to withdraw the collar 47 from engagement with the clutch-disk 46, and thereby disconnect the carrying-wheel 5 from the operating mechanism of the loader, it being observed that the clutch-collar 47 is rotatable independently of but is engaged by the ring $46^d$.

As the hay is carried to the front end of the loader by the conveyer it is detached from the teeth 36 and delivered to the wagon by a rotary delivering device or distributer 53, comprising a shaft 54 and a series of longitudinally-disposed radial blades or paddles 55, provided with slots 56, through which the teeth 36 pass rearwardly as the deliverer is rotated forwardly at a high rate of speed. The shaft 54 is located under the upper end of the conveyer, as shown in Fig. 2, and is journaled in the side boards 2 and 3, the close proximity of the rotary delivering device and conveyer serving to insure the interfitting of the teeth with the blades 55 in order to insure the detachment of the hay from the former and its delivery to the wagon. The shaft 54 is rotated at a high rate of speed by means of speed-gearing between said shaft and the upper conveyer-shaft 39, said gearing preferably including an endless sprocket-chain 57, passed around a sprocket-wheel 58, keyed upon one end of the shaft 39, and around a comparatively small sprocket-wheel 59, keyed upon one end of the shaft 54. (See Figs. 1 and 3.) The speed of the distributer may be increased or diminished by substituting a smaller or larger sprocket for the wheel 59.

In order that the loader may be used in windy weather, the side boards 2 and 3 are provided at their upper edges with buttons 60 for the attachment of a canvas or other cover 61, (see Fig. 3,) designed to prevent the hay from being blown from the conveyer.

The operation of the device is as follows: The swinging leg 12 having been elevated and the brace 14 attached to the keeper 17, the loader is drawn over the ground and the hay is raked up by the rake. As the advance of the loader will effect the operation of the conveyer, the conveyer-teeth, moving inwardly and extended below the loader, will engage the hay held by the rake and carry it upwardly over the floor 4 to the elevated end of the loader. At this point the hay will be detached from the teeth by the rotary distributer, which will not only insure the delivery of the hay to the wagon, but will distribute it properly upon the load. When it becomes necessary to transport the loader from one point to another, the conveyer is thrown out of gear by the manipulation of the handle 52, and the rake-frame is elevated by the depression of the lever 28, or if it is desired to detach the wagon—as, for instance, to remove a load of hay from the field—the loader may be properly supported by dropping the leg 12 to its vertical position, where it will be retained by the engagement of the brace 14 with the keeper 16.

It is thought that from the foregoing the construction, operation, and advantages of my loader will be clearly apparent; but while the present embodiment of the invention is believed at this time to be preferable I do not wish to limit myself to the structural details defined, but reserve the right to effect such changes, modifications, and variations of the illustrated structure as may be properly embraced within the scope of the protection prayed.

What I claim is—

1. In a hay-loader, the combination with a frame, of a rake located at the rear end thereof, a conveyer extending forwardly from the rake and provided with teeth, and a rotary distributer located under the upper end of the conveyer and provided with slots for the reception of the teeth of the conveyer.

2. In a hay-loader, the combination with a frame, of a rake located at the rear end thereof, a conveyer extending forwardly from the rake and provided with teeth, and a rotary distributer disposed under the upper end of the conveyer and comprising a series of radial blades having open-ended slots for the reception of the conveyer-teeth.

3. In a hay-loader, the combination with a frame, carrying-wheels, and a rake, of an endless conveyer mounted in the frame and provided with transverse tooth-bars each carrying a series of teeth, gearing connecting a carrying-wheel with said conveyer to operate the same, a rotary distributer journaled in the frame below the upper end of the conveyer, said distributer comprising a shaft and a series of blades disposed longitudinally of the shaft and provided with recesses through which the teeth of the conveyer are designed to pass, and gearing connecting the conveyer with the shaft of the distributer.

4. In a hay-loader, the combination with a frame, carrying-wheels, and conveyer, of a rake-frame comprising a rotary bar, a series of rake-teeth having angular shanks imposed against one side of the bar and a retaining-plate detachably secured to the bar and having apertures through which the angular ends of the shanks extend, whereby the teeth when removed with the plate will be held in their proper relative positions to facilitate their reattachment to the bar.

5. In a hay-loader, the combination with a frame, an endless conveyer therein, carrying-wheels, and means for operating the conveyer, of a rake-frame comprising a rotary bar and rake-teeth extending therefrom, an arm extending transversely from the bar, a lever fulcrumed in advance of said bar and extended in rear thereof, a pendent arm connected to said lever and pivoted to the arm of the rotary bar, and means for retaining the rake-frame in its elevated position.

6. In a hay-loader, the combination with the axle, carrying-wheels, and the frame mounted on the axle, of a platform constituting an element of the frame structure, shafts journaled in the opposite sides of the frame and located beyond the opposite ends of the platform, guard-plates extending from the opposite ends of the platform and surrounding the shafts, sprocket-wheels carried by said shafts, an endless conveyer comprising sprocket-chains passed around said sprocket-wheels, and transverse tooth-bars connecting said chains and provided each with a series of teeth, means for driving the conveyer from one of the carrying-wheels, means for throwing the conveyer into and out of gear, a rotary distributer located under the upper end of the conveyer and comprising blades having slots for the reception of the conveyer-teeth, gearing connecting said distributer with one of the conveyer-shafts, a swinging rake-frame disposed at the rear end of the loader, and a lever for raising and lowering said rake-frame.

7. In a hay-loader, the combination with a frame, of a rake located at the rear end thereof, a conveyer extending forwardly from the rake and provided with teeth, and a rotary distributer located under the upper end of the conveyer and having radial blades disposed to remove the hay from the teeth of the conveyer.

8. In a hay-loader, the combination with a frame, an endless conveyer, carrying-wheels, and means for operating the conveyer, of a rake-frame comprising a rotary bar and rake-teeth extending therefrom, an extensible arm secured to the bar, an operating-lever having pivotal connection with the arm, means for adjusting the lever, and a latch carried by the lever and engaging the arm to retain the rake-frame in its adjusted positions.

In testimony that I claim the foregoing as my own I have hereto affixed my signature in the presence of two witnesses.

JOHN GROSS.

Witnesses:
FRANK J. GROSS,
JOSEPH TIMMERMANS.